(12) United States Patent
Mödl et al.

(10) Patent No.: US 7,165,716 B1
(45) Date of Patent: Jan. 23, 2007

(54) METHOD, DEVICE AND SYSTEM FOR BIOMETRICALLY AUTHENTICATING A PERSON

(75) Inventors: Albert Mödl, Gersthofen (DE); Elmar Stephan, Munich (DE); Robert Müller, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 112 days.

(21) Appl. No.: 10/030,163

(22) PCT Filed: Jul. 25, 2000

(86) PCT No.: PCT/EP00/07123

§ 371 (c)(1),
(2), (4) Date: Apr. 25, 2002

(87) PCT Pub. No.: WO01/09846

PCT Pub. Date: Feb. 8, 2001

(30) Foreign Application Priority Data

Jul. 30, 1999 (DE) ................................ 199 36 097

(51) Int. Cl.
*G06F 17/60* (2006.01)
(52) U.S. Cl. ....................... 235/379; 235/380
(58) Field of Classification Search ............... 235/379, 235/380, 382, 382.5; 902/2, 3, 4, 5
See application file for complete search history.

(56) References Cited

U.S. PATENT DOCUMENTS

| | | | | |
|---|---|---|---|---|
| 4,733,754 A | * | 3/1988 | Acosta | 186/53 |
| 4,896,363 A | * | 1/1990 | Taylor et al. | 382/5 |
| 5,719,950 A | * | 2/1998 | Osten et al. | 382/115 |
| 5,869,822 A | * | 2/1999 | Meadows, II et al. | 235/380 |
| 5,876,926 A | | 3/1999 | Beecham | |
| 5,982,914 A | * | 11/1999 | Lee et al. | 382/124 |
| 6,081,750 A | * | 6/2000 | Hoffberg et al. | 700/17 |
| 6,325,285 B1 | * | 12/2001 | Baratelli | 235/380 |
| 6,484,936 B1 | * | 11/2002 | Nicoll et al. | 235/379 |
| 6,554,705 B1 | * | 4/2003 | Cumbers | 463/29 |

FOREIGN PATENT DOCUMENTS

| | | |
|---|---|---|
| DE | 19648767 | 6/1997 |
| DE | 19610066 | 9/1997 |
| DE | 19830058 | 12/1999 |
| DE | 19830830 | 1/2000 |
| EP | 0 886 833 B1 | 12/1998 |
| EP | 0 924 655 | 6/2003 |
| GB | 2271657 | 4/1994 |
| WO | WO 95/26013 | 9/1995 |
| WO | WO 98/32093 | 7/1998 |
| WO | WO 98/35118 | 8/1998 |
| WO | WO 98/37519 | 8/1998 |
| WO | WO 98/40962 | 9/1998 |
| WO | WO 99/56250 | 11/1999 |

OTHER PUBLICATIONS

Anil K. Jain, et al., "Fingerprint Matching: Data Acquisition and Performance Evaluation", Department of Computer Science and Engineering, Michigan State University, East Lansing, MI 48824.

* cited by examiner

*Primary Examiner*—Daniel StCyr
(74) *Attorney, Agent, or Firm*—Bacon & Thomas, PLLC

(57) ABSTRACT

A method, apparatus and system for biometric authentication of a person are proposed. Since the detection of biometric data never matches 100 percent, authentication is already effected when the detected data exceed a defined threshold value in comparison to stored reference data. In order to increase security, the invention provides that information about the person's individual properties influencing the biometric data is stored and taken into account in the authentication process. For example, the threshold value is set low upon comparison of a fingerprint only if the person has exceptionally dry or moist skin. On the other hand, the sensor for detecting the biometric data of the fingerprint can also be set to be more sensitive or less sensitive depending on the stored information.

19 Claims, No Drawings

METHOD, DEVICE AND SYSTEM FOR BIOMETRICALLY AUTHENTICATING A PERSON

BACKGROUND OF THE INVENTION

The preset invention relates in general to authentication of a person by detecting individual biometric features of said person and comparing them with corresponding, previously stored biometric features of the same person. In particular, the invention relates to a method for biometric authentication of a person, an apparatus used in this connection—for example a data carrier such as a smart card, etc.—and a system comprising such an apparatus and devices for detecting and comparing the biometric features.

For biometric authentication, a persons biometric features, for example a finger-print, are checked by detecting the biometric feature and comparing it for sufficient similarity with a previously stored biometric feature. Positive comparison grants said person access to data, admission to rooms and similar measures protected from unauthorized access. The biometric features stored as reference data can be stored in any apparatus, for example a fingerprint door opener, or be portable by being stored in a smart card such as a money card, credit card, ID card and the like.

Biometric data can usually not be determined in precisely reproducible fashion, so that a match of stored reference data with currently measured comparative data is virtually impossible. For this reason the result of comparison is fixed as already positive if the match of the compared data exceeds a general threshold value, for example if only a 50 percent match is ascertained.

A disadvantage here is that the detection quality of biometric features varies from person to person. For example, the measuring result of a fingerprint is worse in the case of dry skin or very moist skin. Therefore, the threshold value is usually set altogether very low in order to be permit reliable authentication of all persons. However, a low threshold value simultaneously means a low security standard for access-protected facilities.

SUMMARY OF THE INVENTION

The problem of the present invention is therefore to provide a method, apparatus and system for more reliable biometric authentication.

This problem is solved according to the invention by the features of the independent claims. Advantageous embodiments of the invention are stated in the sub-claims.

WO 95/26013 A1 discloses a system for biometric authentication wherein not only a specific biometric feature is stored and evaluated but also a non-specific biometric feature. During evaluation it is first checked whether the specific biometric feature of a person to be authenticated matches the stored specific biometric feature. After a successful check the non-specific biometric feature is also checked. The check of the non-specific biometric feature is supposed to ensure that the person being checked is actually present in person at the check.

DE 196 48 767 A1 discloses a smart card having a sensor for detecting finger-prints. In addition, the smart card contains memories in which the features of a finger-print detected by the sensor are stored for a later check upon the first use of the card.

The invention is based on the finding that authentication can be made more reliable altogether if the authentication process takes account of a parameter unique to each person which is determined with reference to this person's individual feature quality. For the biometric feature "fingerprint," for example, skin moisture is a quality factor. If the person in question has skin which is comparatively neither especially dry nor especially moist, the parameter for the individual feature quality is fixed at over 100 percent of a standard value, and in the case of especially moist or especially dry skin at a value under 100 percent of the standard value.

This increased or reduced individual parameter as an absolute deviation from the standard value can then be taken as a measure of the lowering of the individual threshold value over a standard threshold value. The standard threshold value can be fixed comparatively high, for example at 80 percent instead of the abovementioned 50 percent. The individual threshold value is then in the range of 50 percent to 80 percent depending on the individual feature quality. This accordingly impedes imitation of the biometric feature, thereby likewise increasing the security of the system.

Alternatively, the parameter for the individual feature quality, once determined, can be used to adjust the sensor system of a measuring instrument used for redetecting the biometric feature for the purpose of authentication. With capacitive measurement of the fingerprint, the quantity of electricity is increased over the standard setting in the case of suitable skin and accordingly reduced with less suitable skin.

Accordingly, it can be expedient to determine separate parameters for different properties influencing a certain person's feature quality, said parameters either being taken into account individually for adjusting the sensor system of a measuring instrument or entering a threshold value individual for this person. A combination of these two measures is also possible.

DETAILED DESCRIPTION OF THE INVENTION

The inventive method works as follows. First, a person's biometric data, for example a fingerprint, are detected and stored as reference data. The data can be stored for example in a first memory area of a data carrier, for example smart card. Said reference data are usually detected in a secure environment and under the instruction of experienced technical personnel. During this phase of reference data detection, user-unique information on the quality of the biometric feature is additionally determined and stored in a second memory area. The user-unique information can be for example the moisture of the skin or a similar individual property of the person in question relevant to the biometric feature. This information about the individual feature quality serves as a parameter in the following verification phase.

In the verification phase, the same biometric feature of the person in question is redetected and converted into biometric data which are compared with the biometric feature stored as reference data in the first memory area. This comparison leads to a match of regularly under 100 percent. Whether this match suffices for authentication depends on whether a predetermined threshold value is exceeded, said value in turn depending on the parameter stored in the second memory area. If the person in question has average skin moisture, for example, the stored parameter has a value of 100 percent. The threshold value is accordingly adjusted to the highest average threshold value. The average threshold value can be adjusted for example to an 80 percent match, so that in the present case authentication only takes place if the match is at least 80 percent. With especially suitable or especially unsuitable skin, the parameter would be for example 120 percent or 80 percent and the associated threshold value accordingly lower, so that authentication already takes place at a 64 percent match, for example.

The parameter can be used alternatively or additionally to adapt the sensor system for redetecting the biometric data in the verification phase to the person's individual feature quality. As mentioned at the outset, the quantity of electricity of a capacitive fingerprint sensor would be increased (e.g. by 16 percent) over the standard setting according to the parameter (e.g. 120 percent) in the case of suitable skin, and accordingly reduced (e.g. to 64 percent) in the case of less suitable skin (parameter 80 percent).

In a further embodiment of the invention it is provided that the possibilities of activity granted the person after successful authentication are limited ("activity filter"), e.g. it can be provided that a maximum amount is stipulated for financial transactions. The limitation is performed either if this person's individual feature quality is bad by nature, i.e. the stored parameter deviates from the standard value, or if the individual feature quality is basically good but the comparison between the stored reference data and the currently detected biometric data is only slightly above the associated, individual threshold value. In both cases there is a comparatively great danger that the redetected biometric data were manipulated.

A further advantageous embodiment of the invention provides that the sensor system for redetecting the biometric data during the verification phase is adapted in such a way that roughly the same measuring results are always achieved independently of the particular environmental conditions. For example, the quantity of electricity can be adjusted in dependence on the humidity in the case of capacitive fingerprint sensors. Environmental influences vary constantly in different places (e.g. bank branches) and at different times of the day or year. The above-described measure can therefore make authentication more reliable in the end. Other environmental influences are for example the lighting conditions, temperature, etc. Such influences can be taken into account by adjusting a camera with respect to film speed, for example, or electrically heating a capacitive sensor chip for detecting the fingerprint. It is especially advantageous if the sensor system is adapted to the environmental conditions prevailing in the phase of reference data detection. For this purpose the environmental conditions prevailing during reference data detection are stored in a third memory area so that they are available together with the individual parameters and reference data.

The invention claimed is:

1. A method for biometric authentication of a person, comprising a reference data detection phase and a verification phase, the method comprising the steps of:
   in the reference data detection phase,
      detecting biometric data of a person and storing the detected biometric data as reference data,
      determining at least one parameter based on at least one individual property of the person that specifically influences sensory detection of said biometric data, and storing the determined parameter to be taken into account in at least one of the following method steps of the verification phase,
   in the verification phase,
      redetecting the person's biometric data,
      comparing the redetected biometric data for a match with the reference data, and
      authenticating the person if the match reaches a degree above a defined threshold value.

2. The method according to claim 1, characterized in that the determined parameter is taken into account in the step of authenticating the person.

3. The method according to claim 2, characterized in that the defined threshold value is dependent on the determined parameter.

4. The method according to claim 1, characterized in that the determined parameter is taken into account in the step of redetecting the biometric data.

5. The method according to claim 4, characterized in that the determined parameter is used for adjusting a sensor system for redetecting the biometric data.

6. The method according to claim 1, characterized by an additional step of adapting a sensor system for redetecting the biometric data to environmental conditions prevailing at the time of redetection.

7. A chip card comprising a first memory area with a person's biometric data as reference data and a second memory area with a parameter based on at least one individual property of the person that specifically influences the sensory detection of said biometric data.

8. The chip card according to claim 7, comprising a third memory area with information on the environmental conditions prevailing during detection of the biometric data contained in the first memory area.

9. A system comprising
   a chip card having a first memory area with a person's biometric data as reference data and a second memory area with a parameter based on at least one individual property of the person that specifically influences the sensory detection of said biometric data,
   a first device for detecting a person's biometric data, and
   a second device for comparing the reference data stored in the first memory area of the chip card for a match with the person's detected biometric data and authenticating the person if the match reaches a degree above a defined threshold value, at least one of the devices being coupled with the parameter stored in the second memory area of the chip card.

10. The system according to claim 9, characterized in that the second memory area of the apparatus with the determined parameter and the device for authenticating the person are coupled by the defined threshold value depending on the determined parameter.

11. The system according to claim 9, characterized in that the second memory area with the determined parameter and the device for detecting the person's biometric data are coupled by the determined parameter being taken into account during adjustment of a sensor system for detecting the biometric data.

12. The system according to claim 9, characterized in that the system contains an activity filter which is variable in dependence on the determined parameter.

13. The system according to claim 9, characterized in that the system contains an activity filter which is variable in dependence on the degree of the match between the redetected biometric data and the stored reference data.

14. The system according to claim 9, characterized in that the device for detecting the person's biometric data includes a sensor system which is variably adjustable to the environmental conditions prevailing during detection of the person's biometric data depending on the information stored in the third memory area of the apparatus.

15. A method for biometric authentication of a person, comprising a reference data detection phase and a verification phase, the method comprising the steps of:
   in the reference data detection phase, detecting biometric data of a person and storing the detected biometric data as reference data, determining at least one parameter based on at least one individual property of the person that specifically influences sensory detection of said biometric data, and storing the determined parameter to be taken into account in at least one of the following method steps of the verification phase, in the verification phase, redetecting the person's biometric data, comparing the redetected biometric data for a match with the reference data, and authenticating the person if the match reaches a degree above a defined threshold value;

wherein the determined parameter is taken into account in the step of authenticating the person and the defined threshold value is dependent on the determined parameter.

16. A method for biometric authentication of a person, comprising a reference data detection phase and a verification phase, the method comprising the steps of:

in the reference data detection phase, detecting biometric data of a person and storing the detected biometric data as reference data, determining at least one parameter based on at least one individual property of the person that specifically influences sensory detection of said biometric data, and storing the determined parameter to be taken into account in at least one of the following method steps of the verification phase, in the verification phase, redetecting the person's biometric data, comparing the redetected biometric data for a match with the reference data, and authenticating the person if the match reaches a degree above a defined threshold value;

wherein the determined parameter is taken into account in the step of redetecting the biometric data and used for adjusting a sensor system for redetecting the biometric data.

17. A method for biometric authentication of a person, comprising a reference data detection phase and a verification phase, the method comprising the steps of:

in the reference data detection phase, detecting biometric data of a person and storing the detected biometric data as reference data, determining at least one parameter based on at least one individual property of the person that specifically influences sensory detection of said biometric data, and storing the determined parameter to be taken into account in at least one of the following method steps of the verification phase, in the verification phase, redetecting the person's biometric data, comparing the redetected biometric data for a match with the reference data, and authenticating the person if the match reaches a degree above a defined threshold value;

wherein the person is granted limited possibilities of activity depending on the determined parameter.

18. A method for biometric authentication of a person, comprising a reference data detection phase and a verification phase, the method comprising the steps of:

in the reference data detection phase, detecting biometric data of a person and storing the detected biometric data as reference data, determining at least one parameter based on at least one individual property of the person that specifically influences sensory detection of said biometric data, and storing the determined parameter to be taken into account in at least one of the following method steps of the verification phase, in the verification phase, redetecting the person's biometric data, and comparing the redetected biometric data for a match with the reference data, authenticating the person if the match reaches a degree above a defined threshold value;

wherein the person is granted limited possibilities of activity depending on the degree of the match between the redetected biometric data and the stored reference data.

19. The method according to claim 18, characterized in that the environmental conditions prevailing during detection of the biometric data as reference data are stored and taken into account when a sensor system is adapted upon redetection of the biometric data to the environmental conditions prevailing at the time of redetection.

* * * * *